July 24, 1934.    J. B. RAVIOLA ET AL    1,967,842
UNIVERSAL JOINT
Filed Nov. 10, 1931
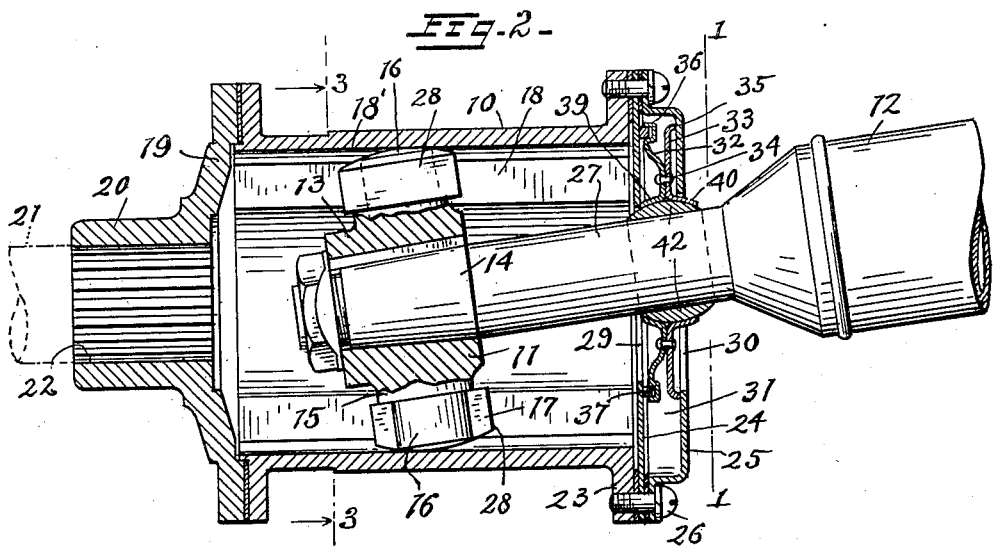
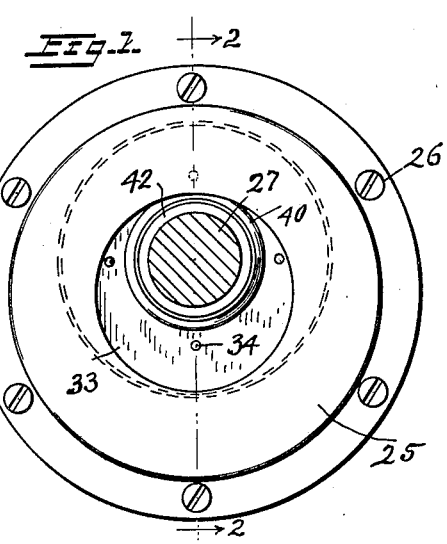
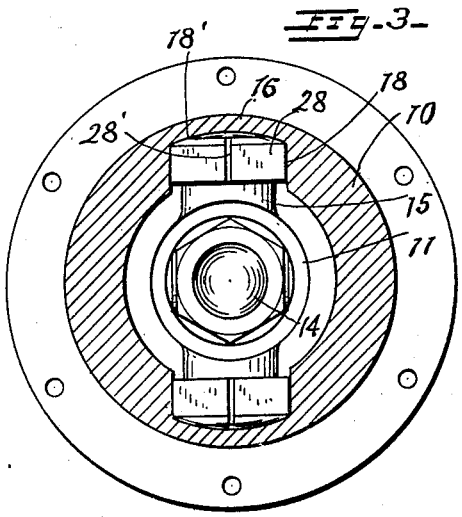
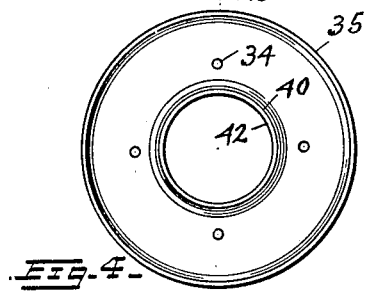
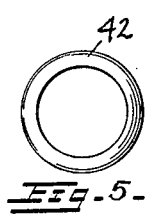
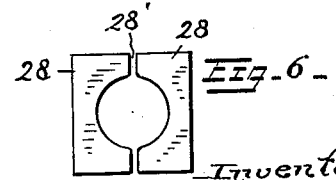
Inventors.
JOSEPH E. PADGETT
JOHN B. RAVIOLA
Kwis Hudson & Kent
attys.

Patented July 24, 1934

1,967,842

UNITED STATES PATENT OFFICE 1,967,842

UNIVERSAL JOINT

John Baptist Raviola and Joseph E. Padgett, Toledo, Ohio

Application November 10, 1931, Serial No. 574,124

8 Claims. (Cl. 64—91)

This invention relates generally to power transmitting couplings, and more particularly to that form of coupling known as a universal joint.

An object of the present invention is to provide a universal joint of improved form.

Another object of this invention is to provide a universal joint, of the sliding block type, embodying novel lubricant retaining means.

The invention may be further briefly summarized as consisting in certain novel combinations and arrangements of parts, hereinafter described, and particularly set out in the appended claims.

In the accompanying sheet of drawing,

Fig. 1 is an end elevation of a universal joint embodying our invention;

Fig. 2 is a longitudinal sectional view therethrough taken substantially on line 2—2 of Fig. 1;

Fig. 3 is a transverse sectional view taken on line 3—3 of Fig. 2;

Fig. 4 is a detached elevational view of the sealing disk assembly;

Fig. 5 is a detached elevational view showing the ball element of the lubricant retaining means; and Fig. 6 is a detached view showing one of the sliding blocks.

In the drawing, to which detailed reference will now be made, we have shown an improved universal joint constructed according to our invention. The universal joint illustrated in this instance, is of the sliding block type, and while the principles of our invention are especially applicable to the form of universal joint just mentioned, wherein it is desirable to retain a supply of lubricant, it should be understood, however, that our invention may be embodied in various types of power transmitting couplings.

In its preferred form, as illustrated in the drawing, our universal joint comprises, in general, a casing or housing 10, which constitutes one element of the power transmitting means, and a crosshead 11, which constitutes another element of the power transmitting means, and which is mounted upon a shaft 12 extending into the casing.

The crosshead may be of any suitable form, and is here shown as comprising a body portion 13, which is keyed or otherwise secured to the tapered end 14 of the shaft 12, and a pair of arms 15 extending outwardly in opposite directions from the body portion. The arms are provided at their outer ends with journal portions 16 in the form of cylindrical pins. These pins extend into bearing blocks 17, which are slidable in longitudinally extending grooves 18 provided in the casing 10. As is usual in universal joints of this type, the bottom wall 18' of each of the grooves is of concave form corresponding in shape to a portion of the wall of a cylinder which is coaxial with the casing 10. As shown in Figs. 2 and 3, the outer ends of the pins 16 and of the blocks 17, mounted thereon, are of convex, rounded form for sliding and rocking movement relative to the walls 18', the convex ends of the pins and blocks being portions of the surface of a sphere having its center on the axis of the casing.

The casing 10, to which we have already referred as being one of the power transmitting elements, may be of any appropriate form, such as the flanged cylindrical body shown in Fig. 2. This body is closed at one end thereof by the flange-like cover 19, which may be provided with a hollow central boss 20 adapted to receive the end of a power shaft, such as the shaft 21, indicated in dotted lines. Relative rotation between the shaft 21 and the boss 20 may be prevented by providing the inner surface of the latter with a plurality of splines or keyways 22. At its other end, the casing 10 is provided with a flange 23, and is adapted to be closed by a pair of cover plates 24 and 25, which may be secured to the flange 23 by means of screws 26. The shaft 12, which extends into the casing, may be a power shaft associated with any one of various kinds of machines, such as the propeller shaft of a motor vehicle. The portion of this shaft, which is located exteriorly of the casing 10, may be of any size or length, but that portion of the shaft, which extends into the casing, is preferably of relatively small diameter, such as the stem portion 27 shown in Fig. 2, upon which the crosshead 11 is mounted.

In a universal joint of this type, power is transmitted from the shaft 12 to the shaft 21 through the crosshead 11 and the casing 10, the interengagement between the pins 16 and the blocks 17, and between the blocks 17 and the grooves 18, providing a driving connection, as is well understood in the art. Since during the functioning of the device the blocks 17 are capable of sliding movement in the grooves of the casing 10, it is desirable to pack the latter with a lubricant of suitable form, which will reduce the friction between the moving parts.

As one feature of our invention, we have provided for more efficient cooperation between each of the pins 16 and its respective block 17, by employing a novel form of construction for the block, which permits an adequate supply of lubricant to reach the inner surface thereof. As is clearly shown in Figs. 3 and 6 of the drawing, each of the blocks 17 is made up of two complementary sections 28. Each of the sections is formed with a flat side face for engagement with a side wall of the groove 18, and a substantially semi-cylindrical recess which forms a bearing surface for the pin 16 when the block is assembled on the crosshead 11. The sections of each block are preferably so proportioned that when they are assembled on their pin, as shown in Fig. 3, they will be spaced apart to provide a slight clearance 28' therebetween. It will be seen from this arrangement that as the blocks are moved along the grooves 18, some of the lubricant contained in the casing will readily enter the spaces 28' and be supplied to the cooperating surfaces of the pins and blocks.

Another feature of our invention is the provision of simple and efficient means for preventing the escape of lubricant from the casing 10. Our lubricant retaining means, as will be explained in detail, includes cover elements 24 and 25, which are shown in Fig. 2 of the drawing as forming a closure means for one end of the casing 10, and which are provided centrally thereof with openings 29 and 30 through which the stem portion 27 of the shaft 12 extends. These cover elements are preferably formed as individual sheet metal stampings, the element 24 being a substantially flat plate or disk, and the element 25 being cupped to provide a recess 31 between the elements, which recess is in communication with the passage leading into the casing 10.

To prevent the escape of lubricant through the openings of the cover elements, I provide a pair of disk members 32 and 33, which surround the stem portion 27 of the shaft 12, and which extend substantially radially outwardly from the shaft into the recess 31. As shown in Fig. 2 of the drawing, these disk members are of dished form and are arranged in back-to-back relation. The disk members are preferably, though not necessarily, secured together by suitable means, such as the rivets 34. The disk member 33 is provided at its outer edge with an angularly disposed annular flange 35, which sealingly engages a surface of the cover element 25, or in other words, one wall of the recess 31. The disk member 32 is provided at its outer edge with an annularly extending groove 36 in which is mounted a bearing and sealing element 37, constructed in the form of a ring of metal, or of any other suitable material. The disk member 32 is so formed that it will be of a resilient and spring-like character, and when the disk members are arranged back-to-back, and the cover element 25 is drawn towards the flange 23 by the screws 26, the resiliency of the disk 32 causes the ring 37 to be pressed against the cover element 24 and the flange 35 to be pressed against the cover element 25.

As stated above, the shaft 12 extends into the casing 10 through the disk members 32 and 35, and to permit relative movement between the shaft and the disk members without the escape of lubricant, we provide means at this point establishing a universal connection between the disk members and the shaft. As shown in Fig. 2, the disk members are provided with oppositely extending annular flanges 39 and 40, which are disposed around the openings through which the shaft portion 27 extends. These flanges are shaped to provide spherical bearing surfaces, which engage the spherical surface of a ball element 42. The flanges 39 and 40 thus cooperate in forming a socket in which the ball element is universally movable. The ball element is provided with an opening therethrough in which the shaft portion 27 is slidable.

It will be seen from the arrangement described, that when power is transmitted through the joint, while the axis of the shaft 12 is not in alignment with the axis of the shaft 21, the disk members 32 and 33 will be slidably moved in the recess 31, and during this movement the flanges 39 and 40, and the ball element 42, cooperate to provide a universal connection between the disk members and the shaft 12. During the sliding movement of the disk members within the recess 31, the flange 35 being resiliently pressed against an inner wall of the recess by the action of the spring disk 32, will have a scraping action upon the wall of the recess, tending to cut away the lubricant clinging to this wall and push it back away from the opening 30 of the cover element 25.

In constructing the lubricant retaining means of our invention, it may be desirable in some instances that the disk member 33 be of a resilient character, as well as the disk member 32. Likewise, in some instances, it may be desirable to omit the bearing ring 37, in which case the disk member 32 may be formed with an integral annular rib or bead adjacent its outer edge, for sliding engagement upon the surface of the cover element 24. It should be pointed out in this connection that, in instances where the disk member 33 affords sufficient sealing action, the member 32 which functions as a spring for pressing the sealing portion of the disk member 33 against the wall of the recess 31, need not be constructed as a disk, but may be a spider, or may have any other appropriate form.

It will now be readily seen that we have provided an improved form of universal joint embodying a novel form of sliding block, and also embodying novel means for retaining lubricant within the casing of the device. This lubricant retaining means, which we have provided, is of very simple form, such that it can be very economically produced, and by virtue of the scraping or cutting action produced by the flange of the sealing disk, is especially efficient and reliable in operation.

While we have illustrated and described the device of our invention in a detailed manner, it should be understood, however, that we do not intend to limit ourselves to the precise arrangement of parts and details of construction which have been illustrated and described, but regard our invention as including such changes and modifications as do not involve a departure from the spirit of the invention and the scope of the appended claims.

Having thus described our invention, we claim:

1. In a universal joint of the sliding block type, the combination of a hollow casing having an opening leading thereinto and a recess communicating with said opening, a shaft extending into said casing through said opening, lubricant retaining means associated with said shaft and comprising a disk surrounding the shaft and shiftable in said recess, said disk having an angularly disposed marginal flange adapted for edgewise scraping engagement with a wall of said recess around said opening, said recess and the disk therein being disposed in a transverse plane which is substantially perpendicular to the axis of the casing, and means for pressing the edge of said flange against said wall.

2. In a universal joint of the sliding type, the combination of a hollow casing having an opening leading thereinto and a recess communicating with said opening, a shaft extending into said casing through said opening, lubricant retaining means associated with said shaft and comprising a pair of oppositely dished disks positioned back to back in said recess and engaging opposite walls thereof, said disks having openings through which said shaft extends, and connecting means movably retained in the openings of said disks and slidable on said shaft for operably connecting the disks with the shaft.

3. In a universal joint of the sliding type, the combination of a hollow casing having an opening leading thereinto, and a recess communicating with said opening, a shaft extending into said casing through said opening, lubricant retaining means associated with said shaft and comprising a pair of disks disposed in said recess and engaging opposite walls thereof, said disks having openings through which said shaft extends and oppositely extending flanges adjacent said openings, and means on said shaft engaging said flanges.

4. In a universal joint of the sliding type, the combination of a casing adapted to contain lubricant, a shaft extending into said casing, means associated with said shaft for preventing the escape of lubricant from said casing, the last mentioned means comprising spaced cover elements carried by said casing, said cover elements being provided with openings through which said shaft extends, a ball element on said shaft, and a pair of members seating against the curved surface of said ball element, one of said members being resilient and the other of said members being a disk provided with a sealing portion adapted to be pressed against one of said cover elements by the resiliency of the first mentioned member.

5. In a universal joint of the sliding type, the combination of a hollow casing having an opening thereinto and a recess communicating with said opening, a shaft extending into said casing through said opening, and lubricant retaining means associated with said shaft, said retaining means comprising a ball element on said shaft, and a pair of members bearing upon said ball element and disposed in said recess, one of said members being resilient and the other of said members being a disk provided with an annular flange which is scrapingly pressed against a wall of said recess by the resiliency of the first mentioned member.

6. In a universal joint of the sliding type, the combination of a hollow casing having an opening leading thereinto and a recess communicating with said opening, a shaft extending into said casing through said opening, lubricant retaining means associated with said shaft, said retaining means comprising a ball element on said shaft, and a pair of disks projecting into said recess and having oppositely extending flange portions seating against said ball element, one of said disks being resilient and the other disk being provided with an annular flange adapted to be sealingly pressed against a wall of said recess by the resiliency of the first mentioned disk.

7. In a universal joint of the sliding type, the combination of a hollow casing having an opening leading thereinto and a recess communicating with said opening, a shaft extending into said casing through said opening, lubricant retaining means associated with said shaft, said retaining means comprising a ball element on said shaft, and a pair of dished disk members seating against the curved surface of said ball element and extending into said recess, said disk members being arranged back-to-back with portions thereof engaging opposite walls of said recess.

8. In a universal joint of the sliding type, the combination of a hollow casing having an opening leading thereinto and a recess communicating with said opening, a shaft extending into said casing through said opening, lubricant retaining means associated with said shaft, said retaining means comprising a ball element on said shaft, and means cooperating with said ball element including a resilient disk member extending into said recess, said disk member having a bearing portion engaging the curved surface of said ball element and an angularly extending marginal flange having the edge thereof scrapingly pressed against a wall of said recess, said recess and the disk member extending thereinto being disposed in a transverse plane which is substantially perpendicular to the axis of the casing.

JOHN BAPTIST RAVIOLA.
JOSEPH E. PADGETT.